Dec. 26, 1961  R. E. MOORE  3,014,404
FILM GATE
Filed April 17, 1959  3 Sheets-Sheet 1

INVENTOR
ROY E. MOORE
BY
ATTORNEYS

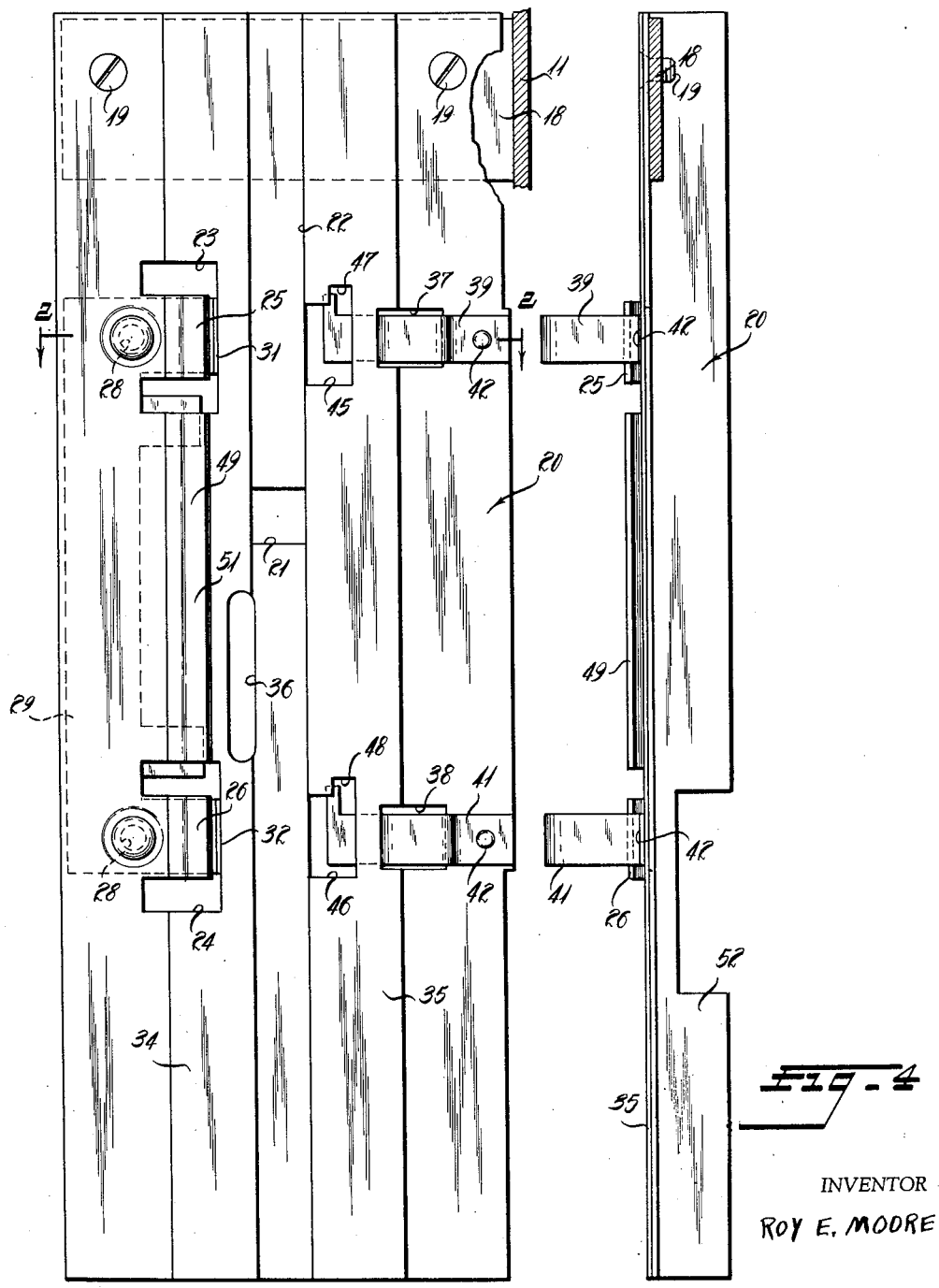

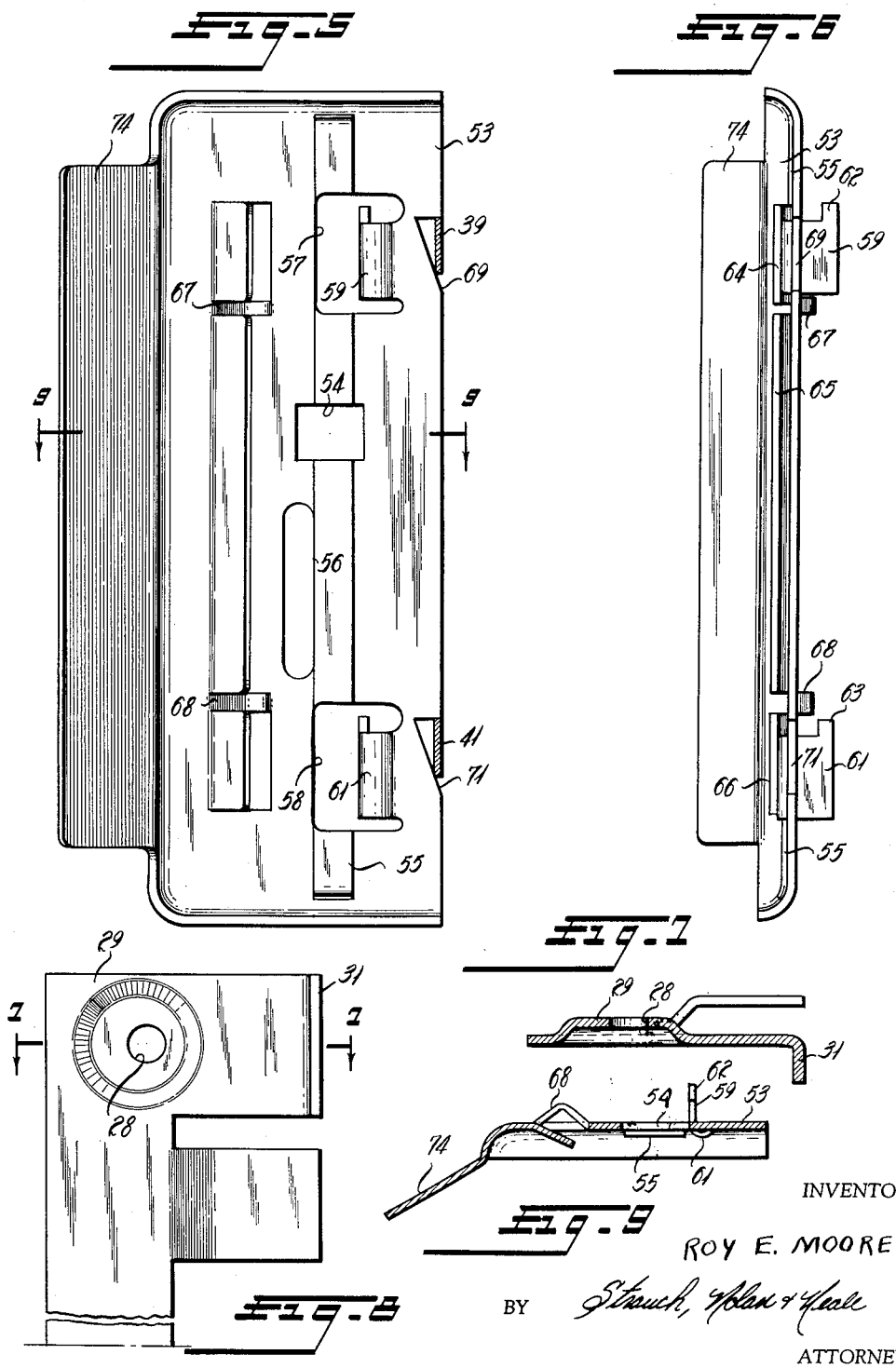

United States Patent Office 3,014,404
Patented Dec. 26, 1961

3,014,404
FILM GATE
Roy E. Moore, Ann Arbor, Mich., assignor to Sylvania Electric Products Inc., a corporation of Delaware
Filed Apr. 17, 1959, Ser. No. 807,179
11 Claims. (Cl. 88—17)

This invention relates to film gate structure in a motion picture projector and particularly to such structure wherein a spring biased pressure pad is removably mounted on a stationary film track and special side loading of the film in the track is provided.

The motion picture projector film gate art is extremely well developed. Many different structures have been proposed and are being used commercially. The more complex structures are found in large 35 and 70 mm. motion picture projectors in theaters, but these are usually too expensive for the so-called amateur or home movie field. The invention provides particularly for the latter field a film gate of simple structure that comprises essentially only a stationary track and a removably mounted spring biased pressure pad wherein the film may be inserted edgewise for camming the track and pad apart and then allowed to settle into proper position on the track under light resilient side loading pressure so as to be accurately located laterally with respect to the exposure aperture.

It is the major object of this invention therefore to provide a novel inexpensive and simple film gate structure for a motion picture projector wherein the film may be threaded speedily with a minimum of effort.

A further object of the invention is to provide a novel film gate structure wherein a pressure pad is removably mounted upon and resiliently biased toward a stationary track and the film moves along the track between side edge guides on the track and pad respectively which are lightly resiliently urged toward each other.

A further object of the invention is to provide a novel projector film gate structure wherein a pressure pad having film edge contacting guides thereon is laterally resiliently biased.

It is a further object of the invention to provide a novel film gate structure wherein a spring biased pressure pad is cammed out by edgewise insertion of the film to be projected.

Further objects of the invention will appear as the description proceeds in connection with the appended claims and the annexed drawings wherein:

FIGURE 3 is a front elevation of the film track;

FIGURE 4 is a side elevation of the film track;

FIGURE 5 is a front elevation of the pressure pad;

FIGURE 6 is a side elevation of the pressure pad;

FIGURE 7 is a partial front elevation of the film guide member on the film track;

FIGURE 8 is a top view of the film guide of FIGURE 7; and

FIGURE 9 is a section through the pressure pad at the exposure aperture on line 9—9 of FIGURE 5.

Figure 1:
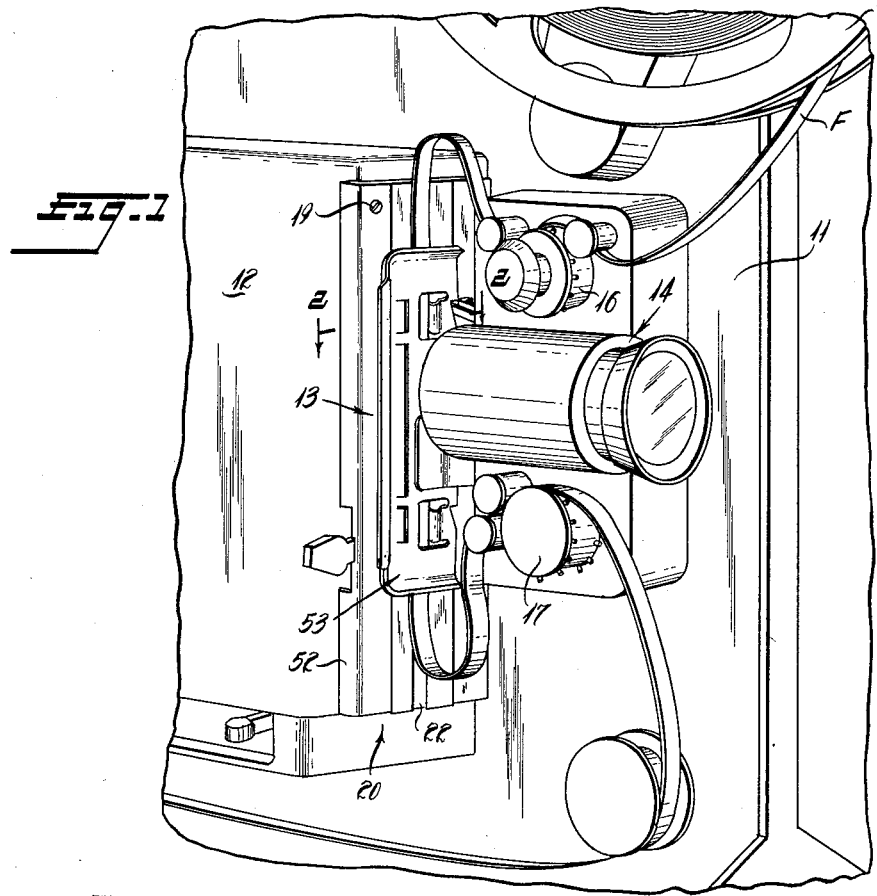
FIGURE 1 is a substantially perspective view showing the motion picture projector embodying the film gate structure of the invention.

Referring to FIGURE 1 the illustrated 8 mm. film projector comprises a rigid platelike frame 11 on one side of which is secured a lamp house 12 containing a lamp adapted to deliver projection light through the film gate assembly indicated at 13 and an objective lens assembly 14. Film F from a supply reel 15 is continuously moved toward the film gate by upper sprocket 16 and continuously drawn from the film gate by lower sprocket 17, the usual loops being provided above and below the film gate and the film being moved through the film gate by an intermittent claw feed (not shown).

Referring to FIGURE 3 the film track 20 is fixedly mounted upon an arm 18 that projects rigidly at right angles from frame 11, being secured thereto as by screws 19.

The film track member 20 comprises a suitably formed metal plate that is usually plated on the side toward the objective so as not to scratch the film and insure smooth sliding of the film over it.

Film track member 20, being rigid with frame 11 and projecting at right angles thereto, has formed in it a projection aperture 21 (FIGURE 3). It will be noted (FIGURES 2 and 3) that the exposure aperture is disposed in a depressed strip 22 of the track member so that the emulsion of the film will not contact the metal surface.

Figure 2:
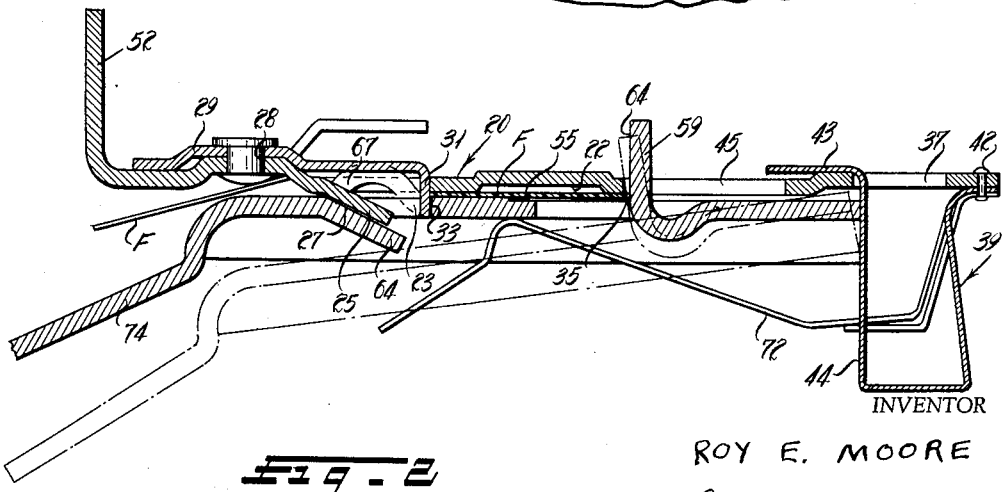
FIGURE 2 is an enlarged section on line 2—2 of FIGURE 1.

Adjacent its outer edge track member is formed, as by cutting apertures at 23 and 24 and bending out tabs 25 and 26 to assume the same inclined relation with respect to the plane of the film gate. As indicated in FIGURE 2 each tab 25 and 26 provides a smooth inclined surface 27 which as will appear is of aid in threading the film into the gate.

Rigidly secured on the back (lump) side of member 20 as by rivets 28 is a film guide member 29 shown in FIGURES 3, 7 and 8. At its inner edge guide 29 is formed with upper and lower guide tabs 31 and 32 that project through apertures 23 and 24 and present smooth vertically aligned film edge guide surfaces 33 disposed parallel to the axis of projection. These guide surfaces accurately locate one edge of the film as it passes through the film gate and by providing the film guide member as a separate part no expensive machinery of member 20 is required to locate surfaces 33 laterally accurately relative to the exposure aperture. The guide 29 may be mounted on member 20 and after lining up tabs 31 and 32 with exposure aperture 21 the rivets 28 are made fast and the structure permanently secured.

It will be observed that the film is supported in passage through the gate on vertical smooth coplanar surfaces 34 and 35, and (FIGURE 3) a vertical slot 36 is formed to permit feed claw engagement with the sprocket holes of the film.

Adjacent the inner edge of member 20 are vertically aligned apertures 37 and 38 that are laterally aligned with tabs 25 and 26 respectively and through which project the side loading springs 39 and 41. These springs are identical and of U-shape with one leg fixed on the member 20 as by rivet 42 (FIGURE 2) and the other leg freely projecting through the associated aperture and terminating in an outturned lug 43 extending along the rear surface of member 20 to trap the spring against withdrawal.

These springs present vertically aligned surfaces 44 adapted to bear on the pressure pad inner side edge as will appear.

Inwardly of apertures 37, 38 member 20 is formed with upper and lower apertures 45 and 46 having notches 47 and 48 that are vertically aligned and increase the vertical dimension of the aperture at one side.

Intermediate apertures 23 and 24 the member 20 is formed with an outwardly bent tab 49 that is inclined at the same angle and is vertically aligned with tabs 25 and 26 and has an inclined smooth surface 51 aligned with surfaces 27.

Along its outer edge member 20 is formed with a rearwardly extending flange 52 that abuts the lamp house.

FIGURES 5 and 6 show the pressure pad member 53 which is formed with a rectangular projection aperture 54 adapted to align with aperture 21 of member 20. It will be observed that pad 53 is formed with a vertically extending shallow recess 55 so as not to bear directly on the film emulsion, this recess being located opposite recess 22 in the assembly.

Similarly pad 53 is formed with a vertical slot 56 to align with slot 36 and clear the film advance claw..

Above and below the projection aperture pad 33 is formed with similar apertures 57 and 58 and part of the removed metal is bent inwardly at right angles to provide lugs 59 and 61 respectively adapted in the assembly to project through track apertures 45 and 46 respectively. Lugs 59 and 61 are vertically aligned and formed with upstanding end tongues 62 and 63 respectively. As shown in FIGURE 2 each lug 59 and 61 presents a smooth film edge guiding face 64 that is parallel to the other edge guide faces 33.

Pad 53 has three vertically aligned outwardly bent tabs 64, 65 and 66 inclined at about the same angle as the tabs 25 and 26 of the track. In the assembly as indicated in FIGURE 2, the inner surfaces of tabs 64, 65, 66 rest on the correspondingly inclined surfaces upper 27, 51 and lower 27 respectively of the track. Between tabs 64 and 65 and between tabs 65 and 66 are two vertically aligned identical rounded projections 67 and 68 respectively that when the pressure pad is in the closed position of FIGURE 2 project into track apertures 23 and 24 respectively and guide the film during edgewise threading.

In the assembly the pad is inserted so that lugs 59 and 61 enter track apertures 45 and 46 at the notches 47 and 48 respectively. In so doing edge notches 69 and 71 respectively of the pad engage and compress springs 39 and 41 respectively, the notches aiding in vertical positioning of the pad. Then the pad is released to be rocked toward the track, being urged in that direction by a pressure pad biasing beam leaf spring 72 having one end anchored on the stationary track and the other end slidably resiliently bearing on the outer surface of pad 53 below the exposure aperture 54 but above the aperture 58, and the end of the spring 72 is turned out so as not to cover aperture 56. The pad 54 is usually manipulated by the operator handling angularly extending flange 74.

When the operator releases the pad the springs 39 and 41 resiliently urge the pad sidewise. When there is no film in the machine, this movement is stopped by lugs 59 and 61 engaging the edges of apertures 45 and 46.

When there is film in the gate it will be seen as shown in FIGURE 2 that the film is contacted along opposite edges by guide surfaces 33 and 64 on the track and pad respectively and the light biasing pressure of springs 39, 41 insures that this edge guiding contact is maintained without laterally buckling the film. The side loading action of springs 39, 41 is independent of spring 72.

For threading the film edgewise into the gate, it is inserted edgewise as indicated in FIGURE 2. The film is fairly laterally stiff and it enters between the surfaces 27 and 51 on the track side and the projections 67, 68 of the pad to automatically outwardly cam pad 53 which rocks about its hinge lugs 59, 61 toward the dotted line position of FIGURE 2 against the pressure of spring 72. Entry of the film continues until its inner edge abuts pad lugs 59, 61 which are still in their track apertures. After the outer edge of the film has passed the edge guides 31, 32, the pad 53 automatically rocks back to the full line position of FIGURE 2 under the bias of spring 72 and film settles on the track into edge abutment with guides 31, 32 by the action of springs 39, 41. In the assembly tabs 31, 32 are of course parallel to lugs 59, 61.

In order to entirely remove pad 53 from the projector it is necessary only to grasp the flange 74 and push inwardly on the pad as permitted by springs 39, 41 until the lug tongues 62, 63 are aligned with notches 47, 48 and then slipping the lugs out of apertures 45, 46. Spring 72 does not interfere with this operation.

It will be observed that (FIGURE 5) springs 39 and 41 are disposed in the pad edge notches in the assembly. This insures that when the film is being reversely moved through the film gate its frictional drag on pad 53 will not lift the pad with relation to the track.

The invention may be embodied in other specific forms without departing fro the spirit or essential characteristics thereof. The present embodiment is therefore to be considered in all respect as illustrative and not respective, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A film gate comprising a stationary track member having a surface along which the film is adapted to be slidably moved, a pressure pad member detachably mounted on said track member, said mounting permitting limited lateral displacement of said pad member with respect to the track member, opposed film side edge contracting guides fixed on the respective members and disposed at laterally opposite sides of said surface, and means resiliently laterally biasing said pad member in the direction of the edge guide on the track member.

2. In the film gate defined in claim 1, said members having aligned projection apertures and being detachably connected by slot and lug hinges above and below the apertures that permit rocking of the pressure pad member about said hinges for edgewise insertion of the film.

3. In the film gate defined in claim 2, said resilient means for laterally biasing the pad member comprising springs reacting against the track member and laterally aligned with said hinge connections.

4. In a film gate having a relatively stationary track member provided with a surface along which the film is adapted to be slidably moved and a pressure pad member detachably rockably mounted at its inner edge on said track member, said pad member having limited movement laterally of said track member, at least one compression spring mounted on the track member and engaging the inner edge of the pad member to laterally outwardly bias said pad member, and opposite film edge guides fixed on the respective member, said spring being of sufficient strength to lightly bias said guides into film edge contact.

5. In the film gate defined in claim 4, the inner edge of said pressure pad member being notched and said spring projecting into said notch to restrict vertical displacement of said pad member with respect to the track member.

6. In a film gate for a motion picture projector, a stationary film track having a projection aperture and at least two vertical spaced openings adjacent its inner edge respectively above and below said aperture, laterally acting compression springs adjacent each opening, and disposed inwardly thereof, and a pressure pad member having an exposure aperture aligned with that of the track and inner side edge abutment with said springs, and hinge lugs on said pressure pad member detachably extending into said openings.

7. In the film gate defined in claim 6, said pressure pad member having inner edge notches and said springs extending into said notches.

8. In the film gate defined in claim 6, said springs being substantially U-shaped leaf springs each having a leg fixed on said track member and a free leg bearing against said pad member.

9. In the film gate defined in claim 6, outer film edge guide surfaces on said track disposed in vertical alignment above and below the projection aperture respectively and vertical aligned parallel inner film edge guide surfaces on said lugs.

10. In a film gate for a motion picture projector, a film track having a smooth front surface over which the film is slidably moved during projection, a vertically disposed recessed portion in said surface, means providing a projection aperture in said recessed portion, means providing track openings in vertical alignment at one side of said recessed portion and located respectively above and below the projection aperture, fixed edge guide means at said one side of the recessed portion comprising a member fixed on the rear surface and having vertically spaced parts projecting through said openings, said parts having vertically aligned smooth film side edge contacting surfaces, means providing vertically spaced and aligned track openings at the other side of said recessed portion, lugs providing opposite vertically aligned opposite film side edge guides projecting into said last named openings, and resilient means lightly biasing said lugs toward said fixed edge guide surfaces, the edges of said last-named track openings adjacent said recessed portion serving as stops for said lugs when there is no film in the gate.

11. In the film gate defined in claim 10, means providing laterally outwardly of each said fixed edge guide surface an inclined similar film guide surface for edgewise insertion of the film, said inclined surfaces rising in the direction of said recessed portion of the track.

References Cited in the file of this patent

UNITED STATES PATENTS

| | | |
|---|---|---|
| 1,781,945 | Case | Nov. 18, 1930 |
| 2,477,624 | Kuehn | Aug. 2, 1949 |
| 2,874,607 | Witkowski | Feb. 24, 1959 |

FOREIGN PATENTS

| | | |
|---|---|---|
| 675,296 | Great Britain | July 9, 1952 |
| 776,697 | Great Britain | June 12, 1957 |
| 1,156,781 | France | Dec. 16, 1957 |

UNITED STATES PATENT OFFICE
CERTIFICATE OF CORRECTION

Patent No. 3,014,404                      December 26, 1961

Roy E. Moore

It is hereby certified that error appears in the above numbered patent requiring correction and that the said Letters Patent should read as corrected below.

Column 2, line 25, for "lump" read -- lamp --; line 34, for "machinery" read -- machining --; column 3, line 39, for "54" read -- 53 --; column 4, lines 19 and 20, for "contracting" read -- contacting --.

Signed and sealed this 7th day of August 1962.

(SEAL)
Attest:

ERNEST W. SWIDER
Attesting Officer

DAVID L. LADD
Commissioner of Patents